United States Patent
Kobayashi

(10) Patent No.: US 7,361,878 B2
(45) Date of Patent: Apr. 22, 2008

(54) IMAGE DISPLAY APPARATUS AND IMAGE PICKUP APPARATUS WITH TWO DIMENSIONAL SCANNING

(75) Inventor: Shuichi Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/416,888

(22) Filed: May 2, 2006

(65) Prior Publication Data

US 2006/0255242 A1 Nov. 16, 2006

(30) Foreign Application Priority Data

May 12, 2005 (JP) .............................. 2005-139750

(51) Int. Cl.
*H01L 27/00* (2006.01)
(52) U.S. Cl. ................... 250/208.1; 359/569; 359/573; 349/196
(58) Field of Classification Search ............. 250/208.1; 348/333.01, 370; 349/196, 201, 202; 359/202, 359/599, 566, 569, 573, 574, 575, 618, 619, 359/620, 621, 625, 626, 628
See application file for complete search history.

(56) References Cited

U.S. PATENT DOCUMENTS 5,467,104 A 11/1995 Furness, III et al.
5,606,447 A 2/1997 Asada et al.
6,639,704 B2 * 10/2003 Kimura ....................... 359/205
2005/0057557 A1 * 3/2005 Kobayashi et al. .......... 345/213

FOREIGN PATENT DOCUMENTS

JP 5-307174 11/1993
JP 6-130378 5/1994
JP 8-334723 12/1996

OTHER PUBLICATIONS

Urey et al. , IEEE, Optical MEMS, 2003 IEEE/LEOS International Conference on, Aug. 18-21, 2003, pp. 161-162.*
Helsel et al, "Wafer Scale Packaging for a MEMS Video Scanner", MEMS Design, Fabrication, Characterization and Packaging, Proceedings of SPIE vol. 4407 (2001) pp. 214-220.

* cited by examiner

*Primary Examiner*—Georgia Epps
*Assistant Examiner*—Francis M LeGasse, Jr.
(74) *Attorney, Agent, or Firm*—Morgan & Finnegan LLP

(57) ABSTRACT

An image forming apparatus with a light source unit emitting a light beam optically modulated based on image/video information, a scanning unit for scanning the light beam emitted from the light source unit two-dimensionally, an optical system that guides the light beam scanned by the scanning unit to the scanned position, a control unit for controlling operations of the light source unit and the scanning unit in synchronization with each other to form the image on the scanned position, and a light beam dividing unit for dividing the light beam scanned by the scanning unit two-dimensionally into a plurality of light beams and emitting them.

10 Claims, 14 Drawing Sheets

IMAGE DISPLAY APPARATUS AND IMAGE PICKUP APPARATUS WITH TWO DIMENSIONAL SCANNING

BACKGROUND OF THE INVENTION

1. Field of the Invention

The present invention relates to an image display apparatus and an image pickup apparatus equipped with the same. The present invention is suitable, for example, in the case where a two dimensional image is displayed on a predetermined surface using scanning means (which will also be called as light beam scanning means) for raster scanning a predetermined surface two-dimensionally with a light beam optically modulated based on image/video information emitted from light source means to make an image on the predetermined surface viewable.

2. Related Background Art

In image display apparatuses such as electronic viewfinder systems used in digital cameras, video cameras or the like, a two-dimensional type display element such as a transmission type liquid crystal or a reflection type liquid crystal is used in combination with an ocular system to allow a viewer to view an image formed and displayed on the two-dimensional type display element as a virtual image through an ocular system.

In recent years, the above-mentioned types of image display apparatuses are required to display images with higher definition. To meet such a requirement, in the case of the above-mentioned two-dimensional type display element, it is needed to produce pixels of a required pixel number on the display element. This presents the problem that pixel defects increase with an increase in the pixel number and the problem that manufacturing of the two-dimensional type display element is difficult since the size of each pixel is small relative to the size of the device. Furthermore, the two-dimensional type display element using liquid crystal suffers from after images that are generated when motion images are displayed, since the response speed of liquid crystal is low.

Still further, when image/video information formed by a two-dimensional type display element such as a liquid crystal display element is viewed, the pixel structure of the liquid crystal is sometimes recognizable.

There is a known image display apparatus in which the pixel structure is made invisible to thereby achieve excellent view by preventing deterioration of the quality of images as viewed (see Japanese Patent Application Laid-Open Nos. H06-130378 and H05-307174).

According to the method disclosed in Japanese Patent Application Laid-Open Nos. H06-130378 and H05-307174, to make the pixel structure of a liquid crystal display unrecognizable, an optical element having a microstructure is disposed in the viewing optical system (an ocular system) used in viewing an image displayed on the liquid crystal display, thereby making the pixel structure invisible.

A scanning type image display apparatus is also known (see U.S. Pat. No. 5,467,104). In the scanning type image display apparatus, instead of using a two-dimensional type display element, a surface to be scanned is scanned with a light beam modulated based on image/video information and emitted from light source means using light beam scanning means that is capable of two-dimensionally scanning to display an image that is viewed by a viewer. U.S. Pat. No. 5,467,104 discloses a technique in which red, blue and green light beams are two-dimensionally scanned in the horizontal and vertical directions and a two-dimensional image is directly formed on the retina of a viewer's eye by means of an optical system.

Characteristically, such an image display technique does not suffer from pixel defects in principle, since it is not necessary to use a display element on which pixels corresponding to required resolution are formed, unlike with the case of the image display apparatus that uses a two-dimensional image display element.

As a system that realizes such a scanning type image display apparatus, a micro electro mechanical system, which will be referred to as MEMS technology manufactured through a semiconductor process is known for use as light beam scanning means (see for example U.S. Pat. No. 5,606,447 and Japanese Patent Application Laid-Open No. H08-334723). The light beam scanning means manufactured based on MEMS technology is suitable for image display apparatuses, since they are small in size and light in weight and can operate at high speed. A MEMS technology serving as two-dimensional scanning means that can effect two-dimensional scanning for use in an image display apparatus for a head mount display apparatus has been known (see for example, Wafer Scale Packaging for a MEMS Video Scanner, SPIE Conference # 4407, 19 (June 2001)). The light beam scanning means based on the MEMS technology mechanically causes resonant motion of a light reflection surface using a torsion bar or the like to incline the light reflection surface utilizing torsion generated at that time, thereby deflecting and scanning a light beam incident on the reflection surface. Since torsion is utilized, the light reflection surface is not rotated but oscillated.

The basic frequency of such mechanical resonant motion is determined by the mechanical dimensions of the light beam scanning means. In addition, the light beam scanning means is attached with an actuator that generates an electrostatic force or an electromagnetic force, and the light beam scanning means is driven by the force generated by it in a resonant manner. According to the technology disclosed in the above mentioned U.S. Pat. No. 5,467,104, such a resonance type light beam scanning means is used for scanning in a first direction, and light beam scanning means for scanning a light beam in a second direction that is different from the first direction is further provided to realize two-dimensional scanning.

The light beam scanning means in a scanning type image display apparatus that utilizes resonance is adapted to perform scanning in a first direction as reciprocate motion, and to perform further scanning in a second direction that is perpendicular to the first direction to realize two-dimensional scanning. In this case, when resonant (oscilaring) reciprocate scanning in the first direction is performed, spaces between scanning lines become wider at the scanning ends in the first scanning direction in each scanning cycle. This makes the spaces between the scanning lines easily recognizable to the viewer, which leads to disadvantageous deterioration in the quality of the image viewed.

As a method for reducing the space between the scanning lines, the resonance frequency may be made higher to make the scanning lines dense. However, this method requires scanning means having high performance that realizes high speed scanning with high accuracy. This requires a complex structure.

Japanese Patent Application Laid-Open Nos. 06-130378 and 05-307174 teach to provide an optical element having a microstructure such as a micro prism or a diffraction grating, in a viewing optical system (or an ocular system) in order to prevent the pixel structure of a liquid crystal display from being recognized when image/video information formed by a two-dimensional display element such as a liquid crystal display is viewed. However, Japanese Patent Application Laid-Open Nos. 06-130378 and 05-307174 are directed to a structure that makes the pixel structure of liquid crystal as display means invisible. In addition, the technologies disclosed in Japanese Patent Application Laid-Open Nos. H06-130378 and H05-307174 are directed to liquid crystal display elements, which suffer from deterioration in the quality of images as viewed due to pixel defects and slowness in the response speed that is not necessarily sufficient for displaying motion pictures.

On the other hand, in the case where images are formed by an light scanning type image display apparatus for view, no technique for preventing spaces between scanning lines on a surface to be scanned (a surface to be viewed) from being recognized has not been proposed so far.

The method of using a micro structure in making the pixel structure of a two-dimensional display element such as a liquid crystal display unrecognizable disclosed in Japanese Patent Application Laid-Open Nos. 06-130378 and 05-307174 can not be applied to a light scanning type image display apparatus without modifications.

SUMMARY OF THE INVENTION

According to the present invention, there is provided an image forming apparatus for displaying an image at a scanned position, the apparatus including light source means for emitting a light beam optically modulated based on image/video information, scanning means for two-dimensionally scanning the light beam emitted from the light source means, an optical system that guides the light beam scanned by the scanning means to the scanned position, control means for controlling operations of the light source means and the scanning means in synchronization with each other to form the image on the scanned position, and light beam dividing means for dividing the light beam scanned by the scanning means two-dimensionally into a plurality of light beams and emitting them.

The above and other objects, features, and advantages of the present invention will become more apparent from the following detailed description taken in conjunction with the accompanying drawings.

DETAILED DESCRIPTION OF THE PREFERRED EMBODIMENTS

An object of the present invention is to provide an image display apparatus in which when a two-dimensional image/video information formed on a surface to be scanned by two-dimensionally scanning a light beam using scanning means is viewed by a viewer, spaces between scanning lines on the surface to be scanned are hardly recognized, thereby enabling excellent view of the image/video information. Specific embodiments of the present invention will be described in the following.

First Embodiment

Figure 1:
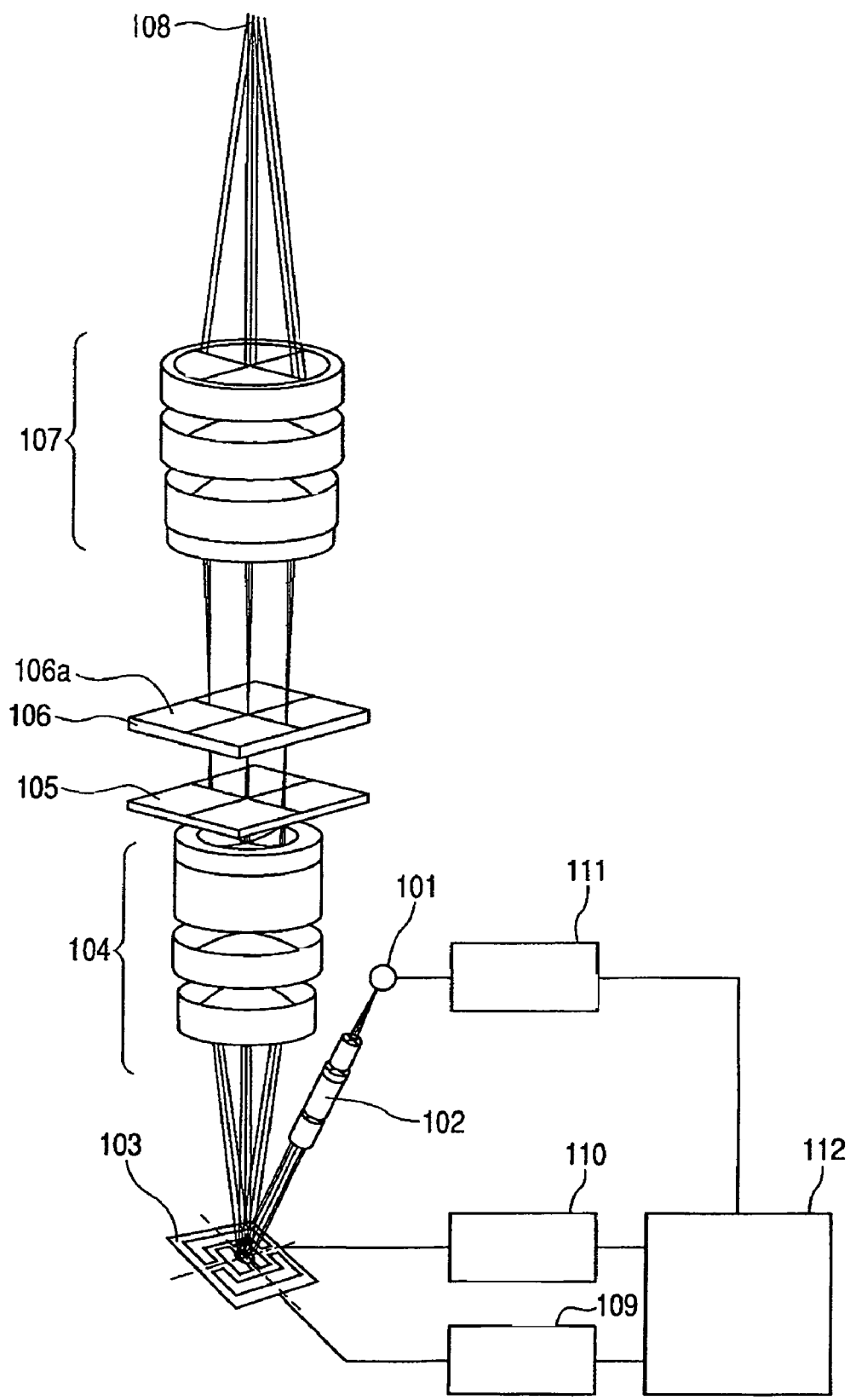
FIG. 1 is a diagram showing the overall structure of a light scanning type image display apparatus according to a first embodiment.

FIG. 1 shows the relevant portion of a light scanning type image display apparatus according to a first embodiment of the present invention. In FIG. 1, light modulated based on image/video information and emitted from a light source 101 is incident, through an optical system 102, on scanning means 103 that can perform two-dimensional scanning. The light emergent from the scanning means 103 is condensed by an optical system 104 onto a surface to be scanned 106a having a light diffusing function of a member to be scanned 106, through light beam dividing means 105 for dividing a light beam incident thereon into a plurality of light beams emergent there from. An image of the light source (that is, an image formed by a light beam that has been optically modulated based on image/video information) is formed on the surface to be scanned (scanned position) 106a through the optical system 102, the scanning means 103 and the optical system 104. The scanning means 103 scans a light beam incident thereon in two dimensional directions to form images of the light source two-dimensionally on the surface to be scanned 106a. The light source 101 is electrically connected with light source driving means 111. The scanning means 103 is electrically connected with a drive circuit (driving means) for scanning in a first scanning direction 109 and a drive circuit (driving means) for scanning in a second scanning direction 110. A control circuit (control means) 112 controls driving of the drive circuits 109, 110 and the light source driving means 111 synchronously. Thus, the surface to be scanned 106a is scanned with a light beam modulated based on a certain image signal and emitted from the light source means 101, so that a scanned image is formed on that surface.

A viewer views the image displayed on the surface to be scanned 106a as a virtual image through an ocular system 107 from the position of an eye point 108.

The image on the surface to be scanned 106a may be viewed directly without using the ocular system 107.

Figure 2:
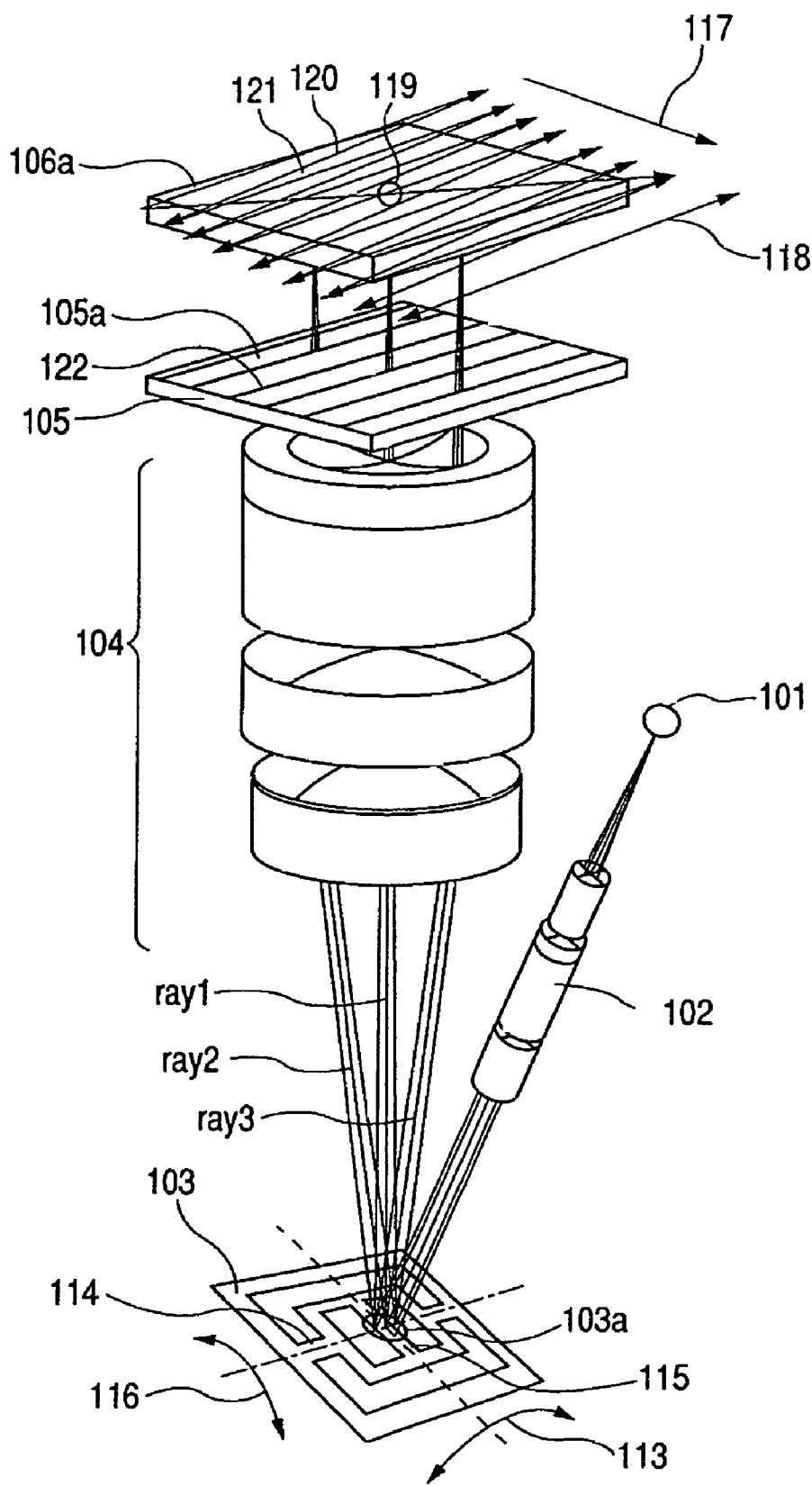
FIG. 2 schematically shows the structure of the relevant portion of the light scanning type image display apparatus according to a first embodiment.

FIG. 2 illustrates an image display method for displaying an image on the surface to be scanned 106a shown in FIG. 1. FIG. 2 shows the structure between the light source 101 and the surface to be scanned 106a in detail. The elements that are designated by the same reference signs as those in FIG. 1 have the same functions as those in FIG. 1. The structure of the scanning means 103 will be described with reference to FIG. 2.

The scanning means 103 is a reflection type scanning means that is produced utilizing semiconductor process. Reference numeral 103a designates a plane mirror (scanning surface) on which reflection enhancing processing has been applied to reflect light. In this embodiment, the mirror is a plane mirror on which a reflection enhancing film is formed. The plane mirror 103a is coupled to a base plate by means of a torsion bar 114 and a torsion bar 115. The scanning means 103 is driven by driving means (not shown) that generates an electromagnetic force or an electrostatic force. The plane mirror 103a is adapted, when driven, to incline in the directions indicated by arrows 113 and 116 to scan the incident light beam two-dimensionally.

In FIG. 2, light beams represented as ray 1, ray 2 and ray 3 are example of light beams scanned by the plane mirror 103a inclined in the direction indicated by arrow 116 about the torsion bar 114 as the axis.

In FIG. 2, the plane mirror 103a is resonantly driven in the direction indicated by arrow 115 (the first direction) at a frequency of 20 kHz, and driven in the direction indicated by arrow 116 (the second direction) at a frequency of 60 Hz. Consequently, the surface to be scanned 106a is raster scanned with a light beam in two directions, namely, in the direction indicated by arrow 118 as a result of resonant driving in the direction of arrow 115 and in the direction indicated by arrow 117 as a result of the driving in the direction of arrow 116.

Figure 3:
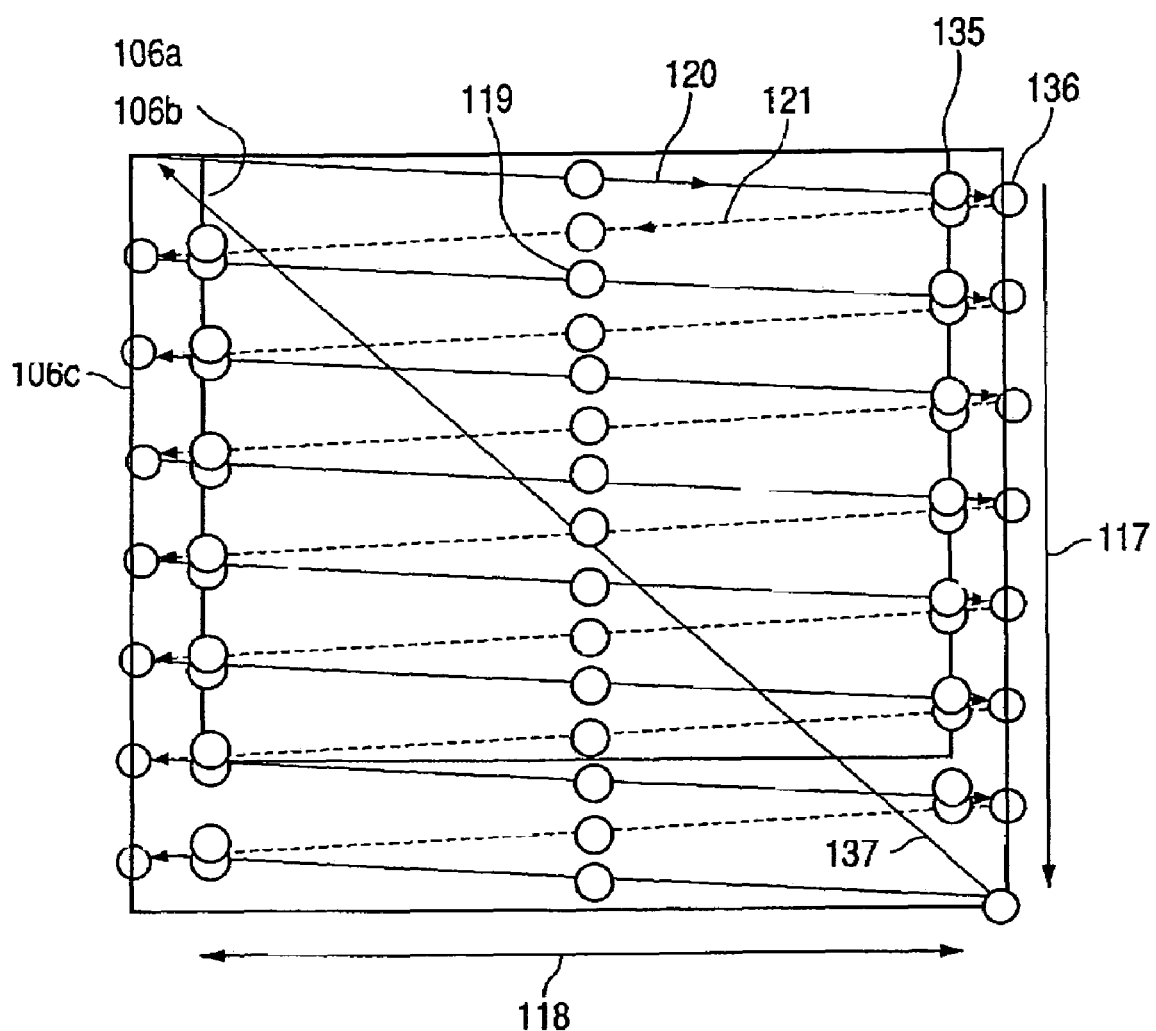
FIG. 3 illustrates scanning with light on a surface to be scanned.

FIG. 3 illustrates the raster scanning on the surface to be scanned 106a. In FIGS. 2 and 3, only a reduced number of scanning lines of the raster scanning are illustrated to facilitate explanation.

Scanning lines are formed on the surface to be scanned 106a as represented by arrows 120 and 121. Arrow 137 represents a return line.

Since scanning in the direction indicated by arrow 118 is oscillation of resonant motion (20 kHz), scanning points overlap at right and left edges of the screen as indicated by point 136. The scanning area on the surface to be scanned 106a is divided into an effective scan area 106b for displaying an image and other scan area 106c. At the edge 135 of the effective scan area 106b on the screen, some of the intervals or gaps between scanning lines are significantly large as will be seen from FIG. 3.

In the central portion of the screen, the distances between scanning lines are uniform, and therefore it is possible to make the gaps between the scanning lines hardly noticeable if the spot size of the image of the optical source is suitably designed in relation to the scanning line. However, at the edges of the effective scan area 106b, the scanning lines are easy to be recognized by the viewer since the gaps between the scanning lines are large. In this embodiment, the gaps between the scanning lines are made hardly recognizable by the use of the light beam dividing means 105.

In the following, the function of the light beam dividing means 105 will be described.

Figure 4A:
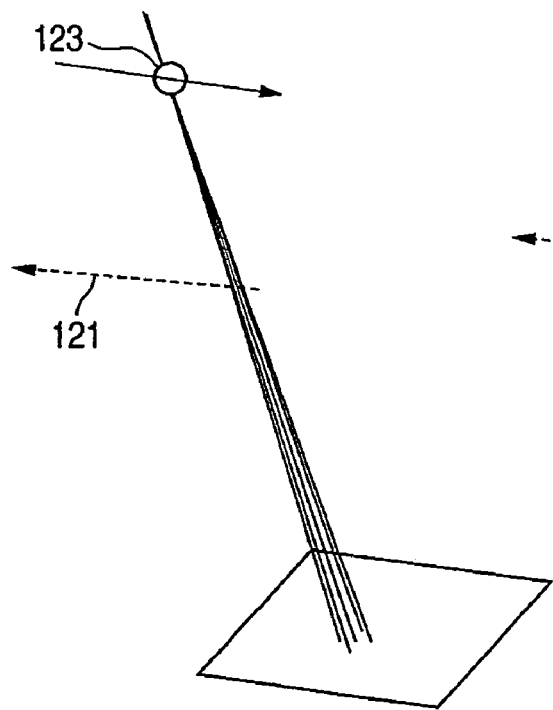
FIGS. 4A, 4B and 4C illustrate scanning lines in a case where no light dividing means is provided.
Figure 4B:
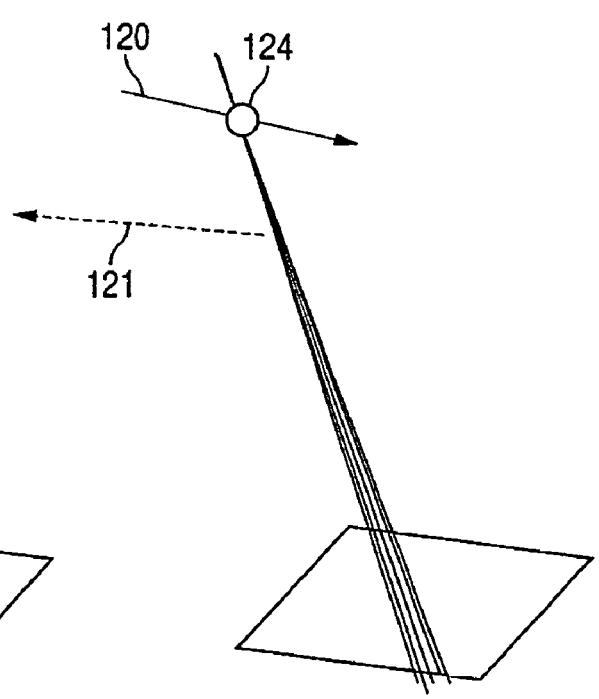
Figure 4C:
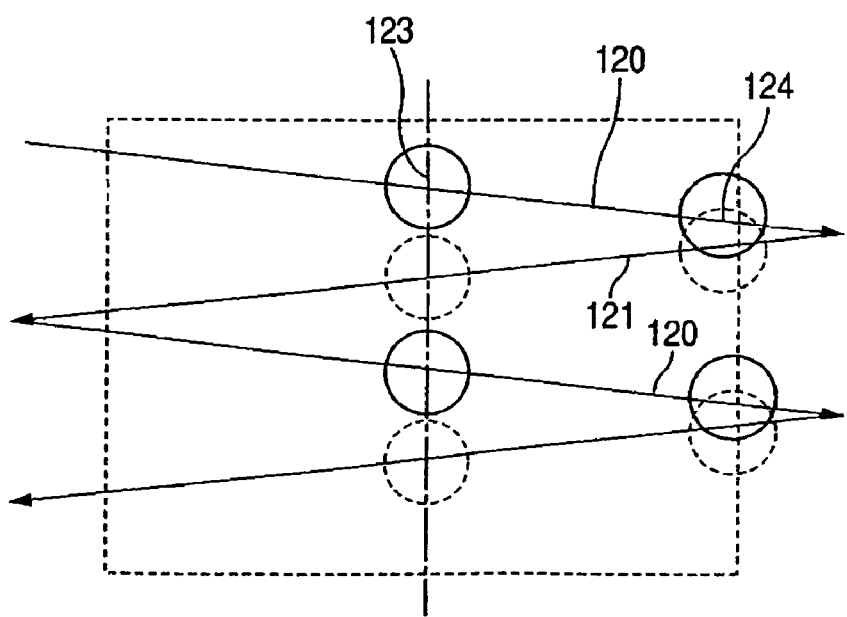

For comparison, FIGS. 4A to 4C illustrate images of the light source on the surface to be scanned 106a in the case where the light beam dividing means 105 is not provided in the optical path. FIGS. 4A and 4B illustrate light source images 123, 124 moved in a scanning manner on the surface to be scanned 106a at an inner portion of the screen and at an edge portion of the screen. FIG. 4C is a drawing similar to FIG. 3 showing the light source images 123, 124.

Figure 5A:
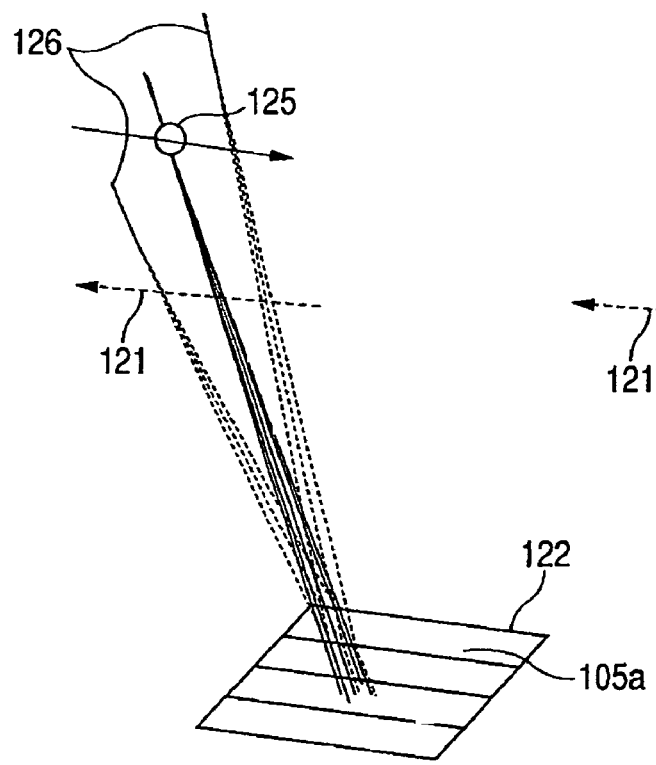
FIGS. 5A, 5B and 5C illustrate scanning lines in a case where light beam dividing means is provided.
Figure 5B:
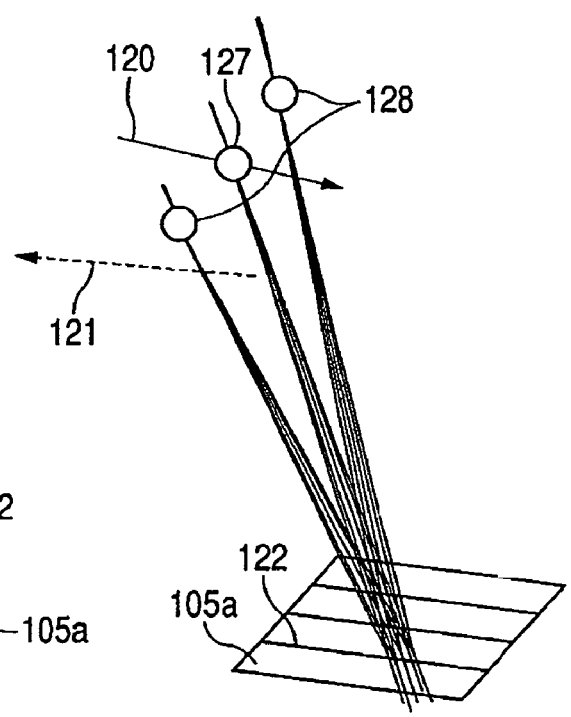
Figure 5C:
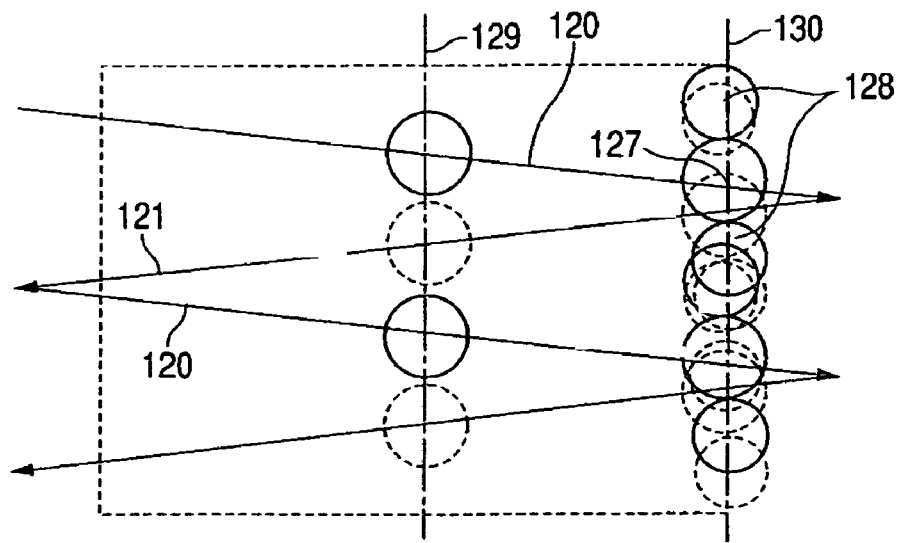

FIGS. 5A to 5C are directed to a case where a light beam dividing function is introduced by providing the light beam dividing means 105a in the optical path. FIGS. 5A and 5B schematically illustrate light source images 125, 127 moved in a scanning manner on the surface to be scanned 106a at an inner portion of the screen and at an edge portion of the screen. In the case shown in FIG. 5C, there is a large gap between scanning lines 120 and 121 at the edge of the screen, and the scanning lines will be recognized by the viewer. On the light beam dividing means 105 used in the first embodiment, a light beam dividing structure 105a composed of one-dimensional diffraction optical elements is formed. The light beam dividing structure 105a is designed to have different diffraction effects between the inner portion of the screen and the edge portion of the screen. Specifically, it is designed in such a way that in the inner portion of the screen, the intensity of the 0-th order diffracted light (125) becomes high and the intensity of the diffracted light (±1st order light) (126) becomes low, while in the edge portion of the screen, the intensity of the diffracted light (128) becomes high.

As a result, the gaps between the scanning lines 120, 121 in the edge portion of the screen are filled with light source images 127, 128 as shown in FIG. 5C, and the viewer can see a smooth image without recognizing scanning lines. In connection with this, the light beam dividing means 105a divides an incident light beam along the direction nearly perpendicular to the scanning lines 120, 121 (namely, along the vertical direction in FIG. 5C, which is not strictly perpendicular to the scanning lines but forms an angle larger than 80 degrees and smaller than 90 degrees with the scanning lines).

Figure 6A:
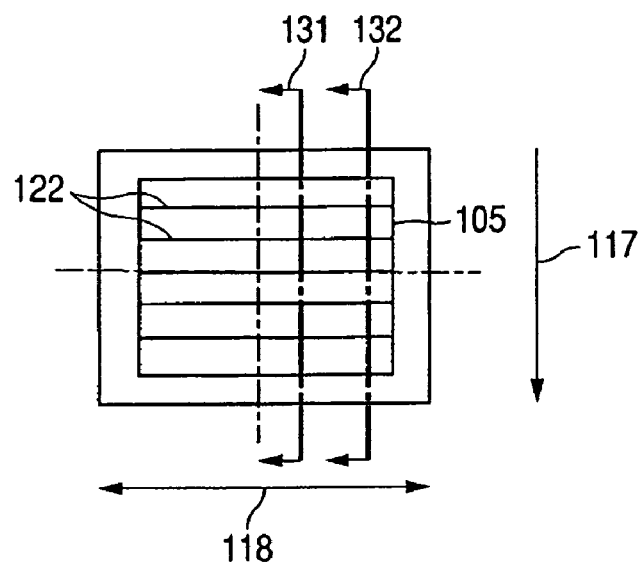
FIGS. 6A, 6B, 6C, 6D and 6E illustrate the structure of light beam dividing means.
Figure 6B:
Figure 6C:
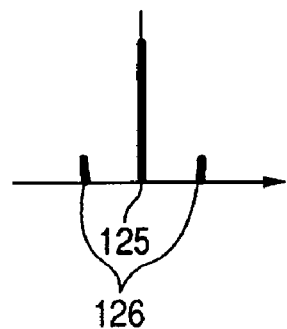
Figure 6D:
Figure 6E:
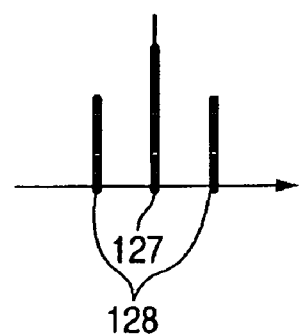

FIGS. 6A to 6E illustrate the structure of the light beam dividing means 105. FIG. 6A schematically shows the structure of the light beam dividing means 105. The light beam dividing means 105 is a diffraction optical element having a periodic structure 122 along the scanning direction indicated by arrow 117 (i.e. the sub scanning direction). FIGS. 6B and 6D are cross sectional views taken along lines 131 and 132 in FIG. 6A respectively. The diffraction optical element having the periodic structure 122 includes structures like diffraction gratings 131s, 132s having the same pitch and different depths. The light dividing means 105 is constructed as a diffraction grating whose depth gradually increases from the center to the edges, as shown by two cross sectional views 131, 132 in FIGS. 6B and 6D. FIGS. 6C and 6E schematically show the light diffracting effect of the light beam dividing means 105. Only ±1st order diffracted light is shown in FIGS. 6C and 6E, though ±1st order diffracted light, 2nd order diffracted light and 3rd order diffraction (tive) light and so on are actually generated. In this case they are very weak. In the portion near the center of the screen, the depth of the diffraction grating is designed to be small so that the 0-th order light 125 is mainly generated and the intensity of the 1st order light 126 becomes low as shown in FIG. 6B. In the edge portion of the screen, ±1st order light 128 having certain intensity is generated in addition to the 0-th order light 127 as shown in FIG. 6C. The diffraction light appears in the direction in which the periodic structure is present. In other words, it appears along the direction in which the scanning lines are spaced apart (i.e. the direction nearly perpendicular to the scanning lines). Therefore, the gaps between the scanning lines are filled with the ±1st order light. This is effective in making the gaps between the scanning lines hard to be recognized.

In the first embodiment, the scanning means 103 has been illustrated as one device that performs two-dimensional scanning. However, the scanning means is not limited to this, but two scanning means may be used to perform scanning in the respective directions; perpendicular to each other.

Figure 7A:
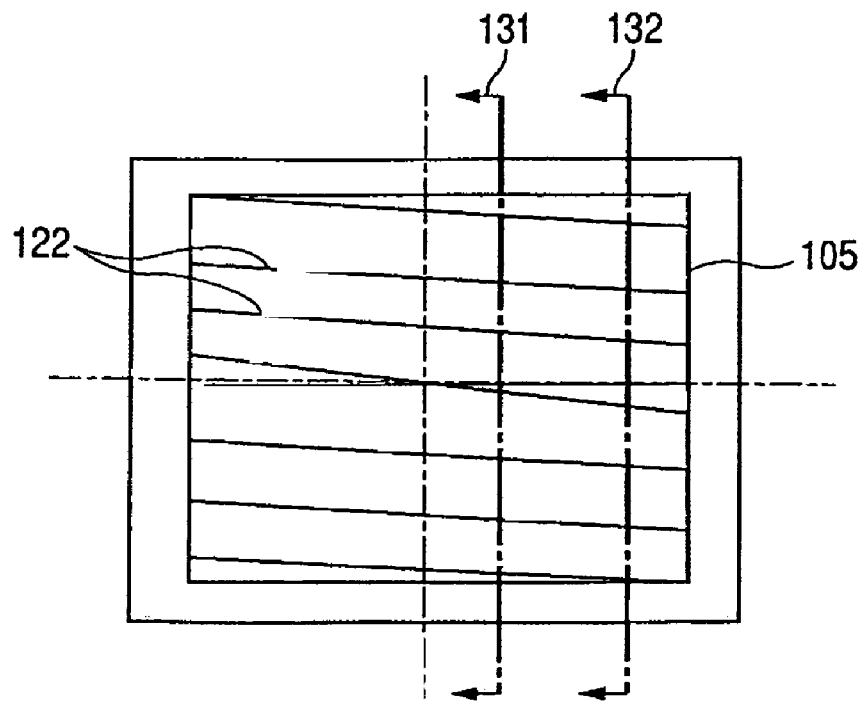
FIGS. 7A, 7B and 7C illustrate light beam dividing means according to another mode.
Figure 7B:
Figure 7C:

In the first embodiment, the light beam dividing means 105 is composed of a diffraction optical element having a periodic structure along the direction nearly perpendicular to the direction of scanning realized by resonant motion as shown in FIGS. 6A to 6E. Alternatively, the direction of the diffraction optical element 122 having a periodic structure may be inclined relative to the scanning direction, as shown in FIGS. 7A to 7C. This helps to reduce generation of moiré fringes etc . . . . In connection with the relationship among FIGS. 7A to 7C is equivalent to the relationship among FIGS. 6A to 6C.

In the first embodiment, the light beam dividing means 105 has a periodic structure whose pitch is constant but whose depth varies depending on the position. Alternatively, the effect of making scanning lines hard to be recognized by the viewer can be realized also in the case where the periodic structure having the same pitch and the same depth at all positions is used.

Figure 8A:
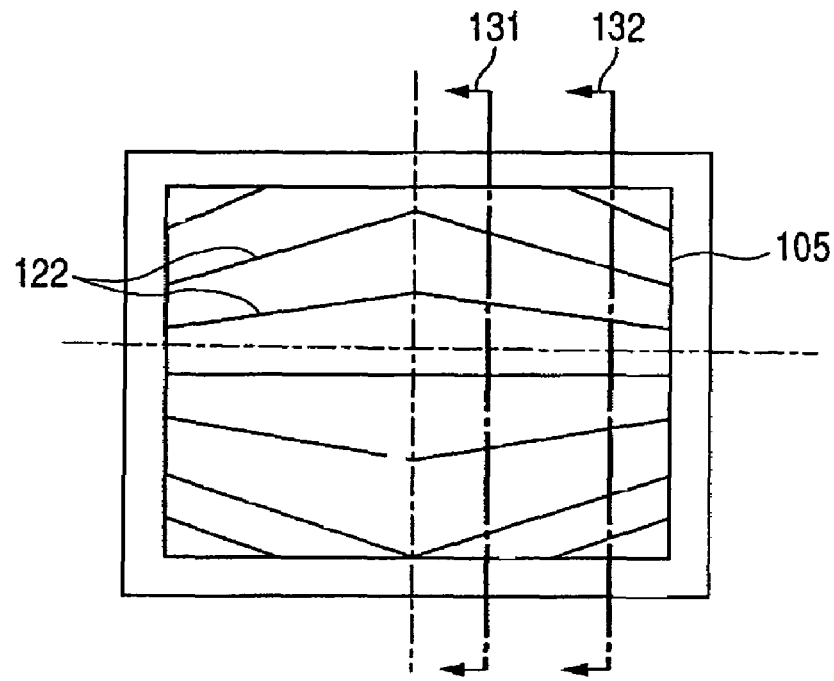
FIGS. 8A, 8B and 8C illustrate light beam dividing means according to another mode.
Figure 8B:
Figure 8C:

As shown in FIG. 8A to 8C the pitch of the grating of the diffraction grating 122 may be varied between the central portion of the screen and the edge portion of the screen. The light beam separation width may be set smaller near the center portion of the screen and larger in the edge portion of the screen. The relationship among FIGS. 8A to 8C is equivalent to the relationship among FIGS. 6A to 6C.

Although in the first embodiment, one light source 101 is used, the light source 101 may be replaced by red, blue and green light sources that can be modulated. In that case full color images can be displayed. Furthermore, although in the first embodiment, the apparatus is arranged to scan the surface to be scanned 106a with one beam, advantageous effects similar to those described in the above are also achieved in the case where a plurality of light sources are provided to scan separate scan areas on the surface to be scanned with a plurality of light beams respectively. In the first embodiment, the light beam dividing means 105 is disposed in the optical path between the surface to be scanned 106a and the scanning means 103. However, the position of the light beam dividing means is not limited to this, but advantageous effects similar to those described in the above are also achieved in the case where light beam dividing means having a predetermined structure is disposed between the scanning means 103 and the eye point 108 of the viewer.

Figure 9:
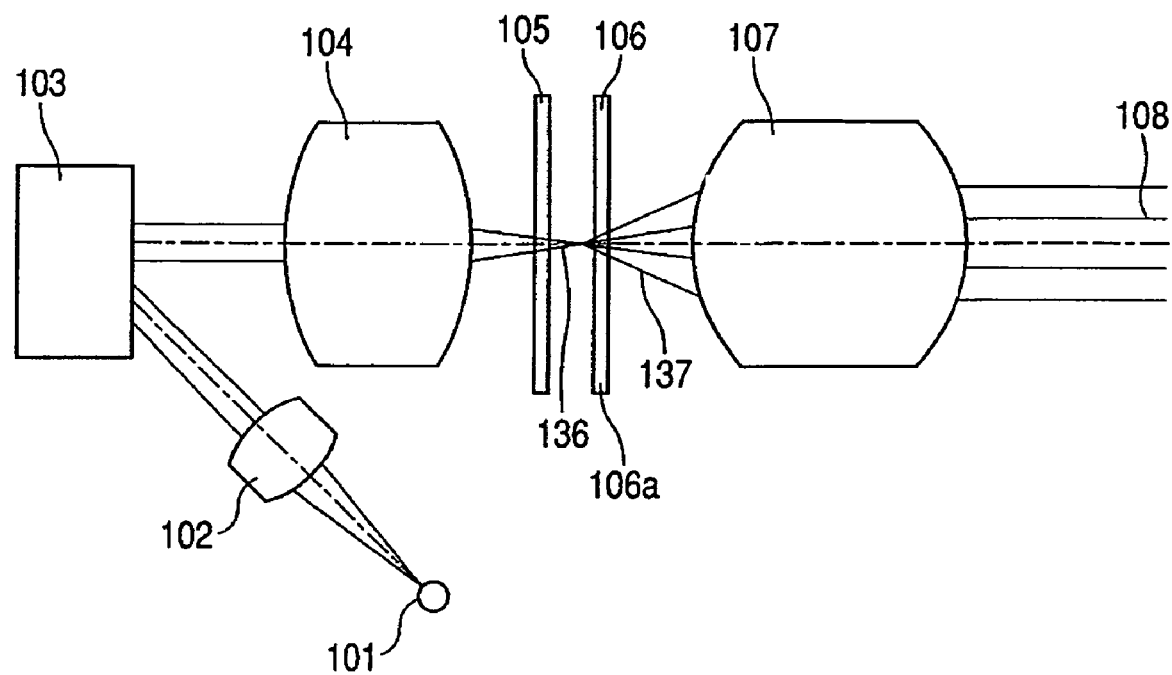
FIG. 9 illustrates a partial modification of the first embodiment.

FIG. 9 illustrates an operation of an apparatus similar to that shown in FIG. 1. In this apparatus, the surface to be scanned 106a has a light diffusing function.

An image of the light source 101 is formed on the surface to be scanned 106a. A micro structure having a light diffusing function such as a micro lens array is formed on the surface to scanned 106a. As shown in FIG. 9, the light beam 136 incident on the surface to be scanned 106a is diffused and converted into a light beam 137 having a larger angle of divergence, whereby the pupil diameter at the eye point 108 for the viewer can be made larger.

In this case, if the light beam dividing means 105 is disposed on the eye point 108 side of the surface to be scanned 106a, problems, such as that the light beam of the light beam dividing means 105 becomes visible to the viewer, sometimes arise, though the advantageous effects similar to those described above can be achieved. Therefore, it is preferred that the light beam dividing means 105 are disposed in the optical path between the scanning means 103 and the surface to be scanned 106a.

Although the light beam dividing means 105 in the first embodiment is composed of a one-dimensional diffraction optical element, it may be composed of a two-dimensional diffraction optical element or a structure like a micro prism, alternatively.

Second Embodiment

Figure 10:
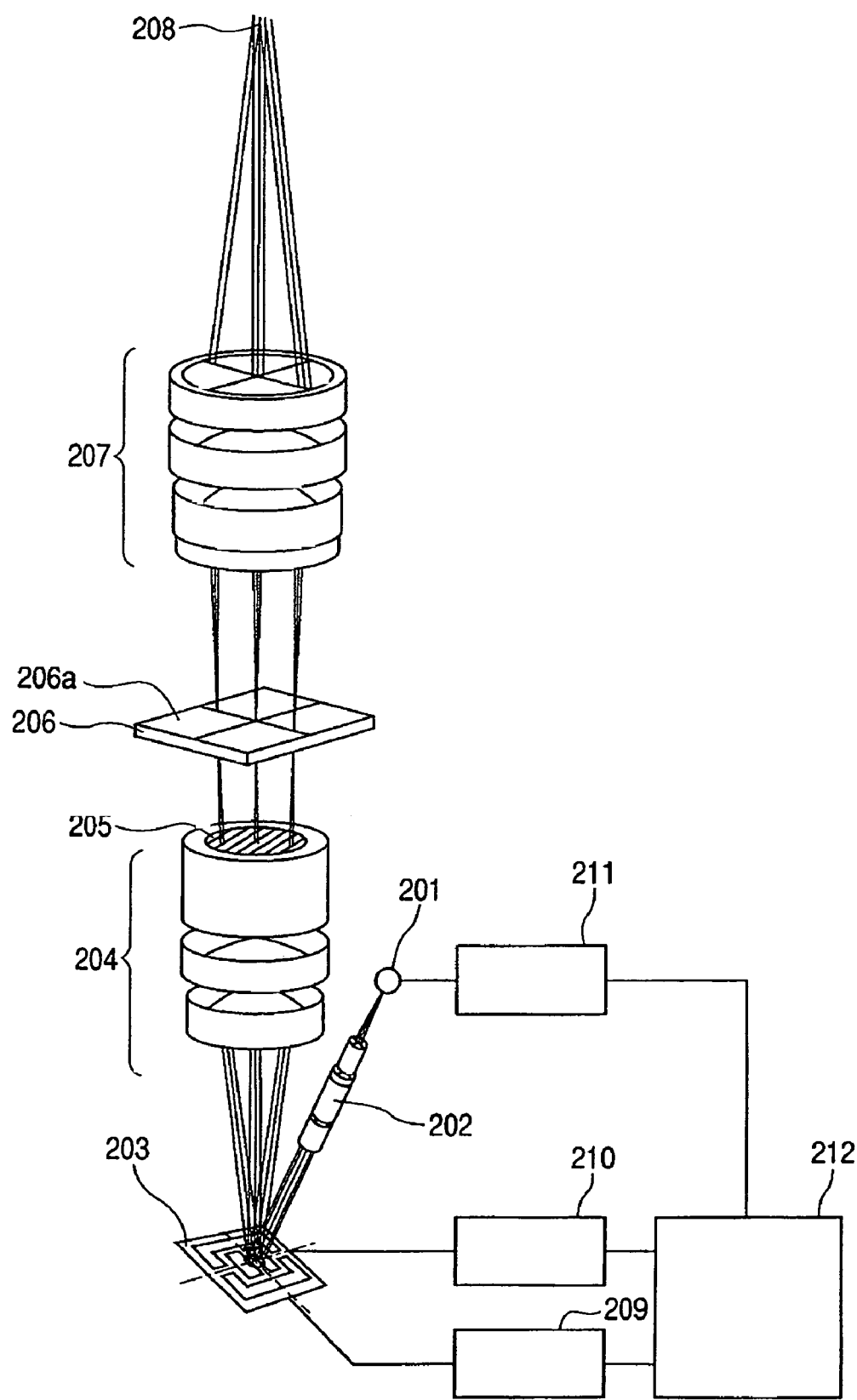
FIG. 10 is a diagram showing the overall structure of a light scanning type image display apparatus according to a second embodiment.

FIG. 10 shows the relevant portion of a light scanning type image display apparatus according to a second embodiment of the present invention. What is different in the second embodiment from the first embodiment is that a light beam dividing means 205 is integral with an optical system 204. Light emitted from a light source 201 is incident on scanning means 203 through an optical system 202. Light emergent from the scanning means 203 is condensed on a surface to be scanned 206a having a light diffusing function of a member to be scanned 206 through the optical system 204 in which the light beam dividing means 205 is formed. An image of the light source 201 is formed on the surface to be scanned 206a through the optical system 202, the scanning means 203 and the optical system 204. The scanning means 203 has the structure same as that of the scanning means 103 in the first embodiment. The scanning means 203 scans a light beam incident thereon in two dimensional directions to form images of the light source two-dimensionally on the surface to be scanned 206a. The light source 201 is electrically connected with light source driving means 211. The scanning means 203 is electrically connected with a drive circuit 209 for scanning in a first scanning direction and a drive circuit 210 for scanning in a second scanning direction. A control circuit 212 controls the drive circuits 209, 210 and the light source driving means 211 synchronously. Thus, an image according to a certain image signal is displayed on the surface to be scanned 206a as a scanned image, in a manner similar to the first embodiment. A viewer views the image displayed on the surface to be scanned 206a as a virtual image through an ocular system 207 from the position of an eye point 208.

In the second embodiment, the operations of the scanning means 203 and the light beam dividing means 205 are similar to the operations of the scanning means 103 and the light beam dividing means 105 in the first embodiment.

Figure 11:
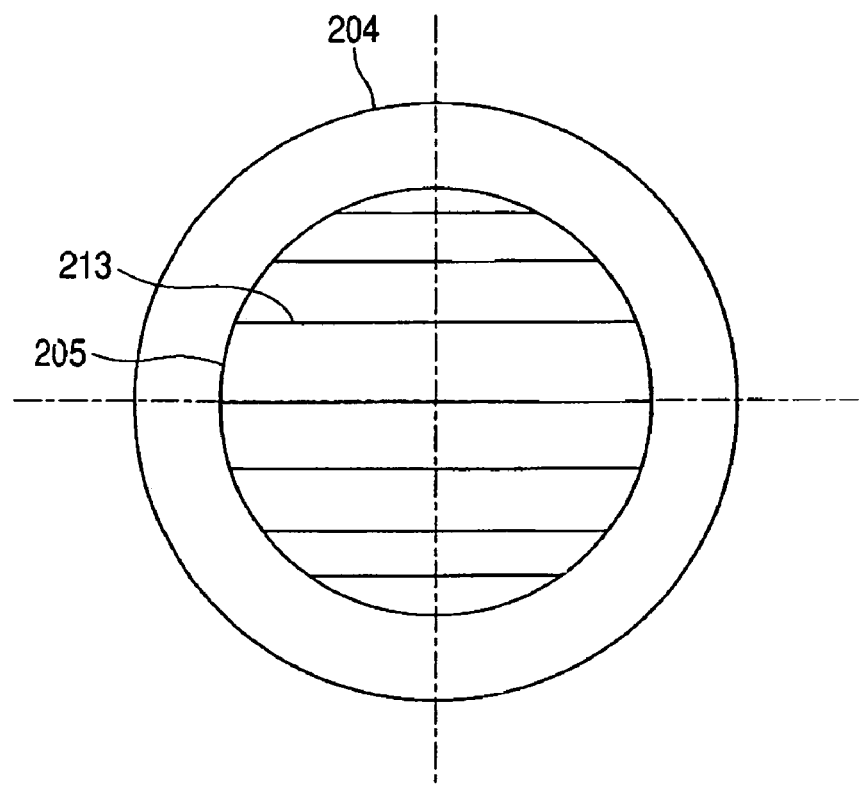
FIG. 11 illustrates the structure of light beam dividing means.

FIG. 11 shows the structure of the light beam dividing means 205. The light beam dividing means 205 is formed on a surface (a light transmission surface) 213 of the optical system 204.

By combining the light beam dividing means 205 with the optical system 204 for example by providing it on a surface of the optical system 204 as is the case with the second embodiment, it is possible to reduce the number of components, thereby reducing the size of the apparatus. In addition, this leads to a decrease in the number of the interfaces, whereby transmission of the optical system can be enhanced.

Although in the second embodiment, one light source 201 is used, the light source 201 may be replaced by red, blue and green light sources that can be modulated. In that case, full color images can be displayed. Furthermore, although in the second embodiment, the apparatus is arranged to scan the surface to be scanned 206a with one beam, advantageous effects of the second embodiment are also achieved in the case where a plurality of light sources are provided to scan separate scan areas on the surface to be scanned with a plurality of light beams respectively.

In the second embodiment, the light beam dividing means 205 is disposed in the optical path between the surface to be scanned 206a and the scanning means 203. However, the position of the light beam dividing means is not limited to this, but advantageous effects of the second embodiment are also achieved in the case where light beam dividing means having a predetermined structure is disposed between the scanning means 203 and the eye point 208 of the viewer.

Third Embodiment

Figure 12:
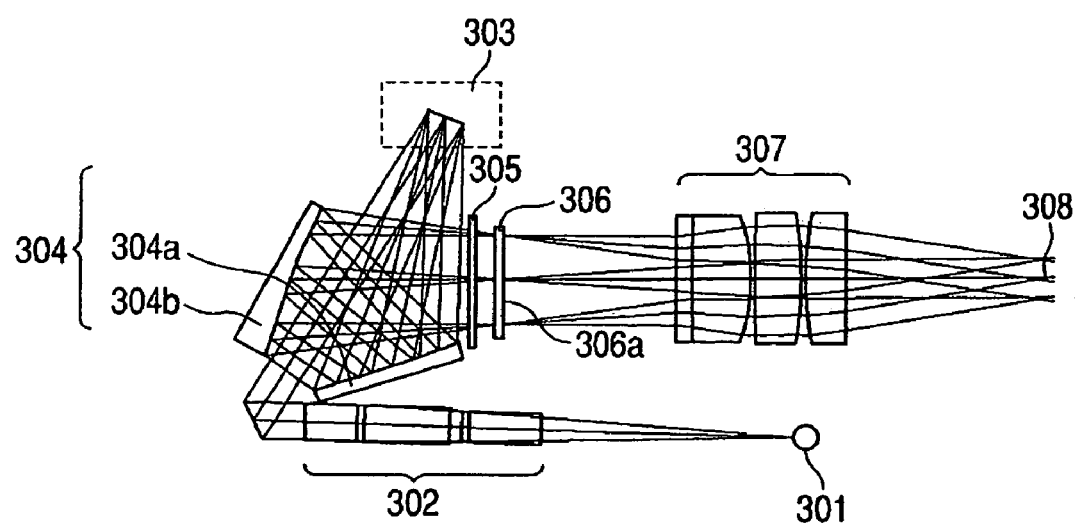
FIG. 12 is a diagram showing the overall structure of a light scanning type image display apparatus according to a third embodiment.

FIG. 12 shows the relevant portion of a light scanning type image display apparatus according to a third embodiment of the present invention. In the third embodiment, an optical system for guiding a light beam from scanning means onto a surface to be scanned is composed of a reflection type optical member.

Light emitted from the light source 301 is incident on scanning means 303 through an optical system 302. Light emergent from the scanning means 303 is reflected by a first reflection mirror 304a and a second reflection mirror 304b that constitute an optical system for scanning 304, and focused on a surface to be scanned 306a of a member to be scanned 306 through a light beam dividing means 305. The first and second reflection mirrors 304a and 304b are free curved surface mirrors that do not have a rotation symmetry axis. The light beam emergent from the scanning means 303 is condensed onto the surface to be scanned 306a that has a light diffusing function, through the optical system 304. An image of the light source 301 is formed on the surface to be scanned 306a. The scanning means 303 has a structure similar to the scanning means 103 in the first embodiment. The scanning means 303 scans a light beam incident thereon in two dimensional directions to form images of the light source two-dimensionally on the surface to be scanned 306a. The light source 301 and the scanning means 303 are controlled synchronously, so that an image according to a certain image signal is displayed on the surface to be scanned 306a as a scanned image. A viewer views the image displayed on the surface to be scanned 306a as a virtual image through an ocular system 307 from the position of an eye point 308.

The operations of the scanning means 303 and the light beam dividing means 305 in the third embodiment are similar to the operations of the scanning means 103 and the light beam dividing means 105 in the first embodiment.

The light beam dividing means 305 functions to fill gaps between scanning lines with light beams in a manner similar to in the first embodiment.

Figure 13:
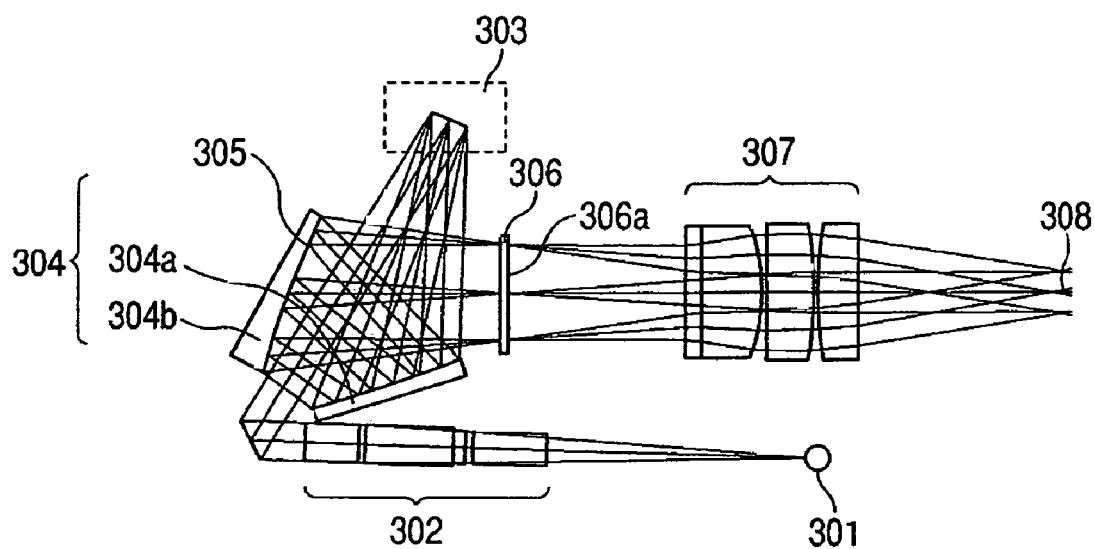
FIG. 13 is a diagram showing the overall structure of a light scanning type image display apparatus according to a modification of the third embodiment.

FIG. 13 shows another mode of the third embodiment. In the apparatus shown in FIG. 13, the light beam dividing means 305 is formed on the second reflection mirror 304b. Similarly to FIG. 12, FIG. 13 also shows a cross section along the scanning direction, among the scanning directions of the scanning means 303, in which the frequency of scanning is lower.

In the third embodiment, by combining the light beam dividing means 305 with the optical system 304 for example by providing it on the surface of the second reflection mirror 304b in a manner similar to in the second embodiment, it is possible to reduce the number of components, thereby reducing the size of the apparatus. In addition, this leads to a decrease in the number of the interfaces, whereby transmission of the optical system can be enhanced.

Although in the third embodiment, one light source 301 is used, the light source 301 may be replaced by red, blue and green light sources that can be modulated. In that case, full color images can be displayed. Furthermore, although in the third embodiment, the apparatus is arranged to scan the surface to be scanned 306a with one beam, a plurality of light sources may be provided to scan separate scan areas on the surface to be scanned with a plurality of light beams respectively.

In the third embodiment, the light beam dividing means 305 is disposed in the optical path between the surface to be scanned 306a and the scanning means 303. However, the position of the light beam dividing means is not limited to this, but advantageous effects of the third embodiment are also achieved in the case where light beam dividing means having a predetermined structure is disposed between the scanning means 303 and the eye point 308 of the viewer.

Fourth Embodiment

Figure 14:
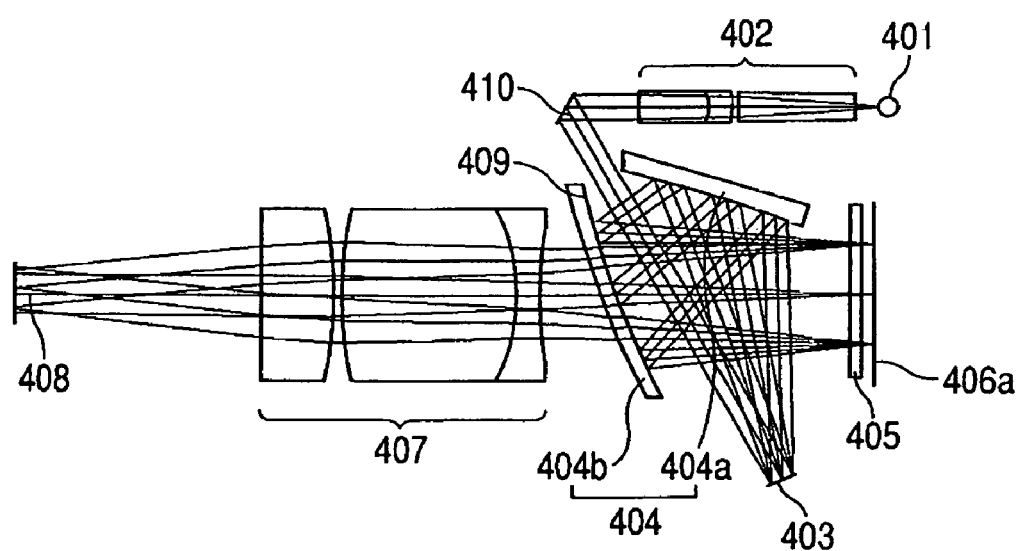
FIG. 14 is a diagram showing the overall structure of a light scanning type image display apparatus according to a fourth embodiment.

FIG. 14 shows the relevant portion of a light scanning type image display apparatus according to a fourth embodiment of the present invention. In the fourth embodiment, the surface to be scanned is constructed as a reflective surface, unlike with the third embodiment. In FIG. 14, the fourth embodiment is shown in a cross section taken along the scanning direction, among the two-dimensional scanning directions of scanning means, in which the frequency of scanning is lower.

Light emitted from a light source 401 is incident on scanning means 403 through an optical system 402 and a reflection mirror 410. Light emergent from the scanning means 403 is reflected by a first reflection mirror 404a and a second reflection mirror 404b, one surface 409 of which functions as a half mirror, and then focused on a reflection type surface to be scanned 406a having a light diffusing function, through light beam dividing means 405. The first reflection mirror 404a and the second reflection mirror 404b constitute an optical system for scanning 404.

The first and second reflection mirrors 404a and 404b are free curved surface mirrors that do not have a rotation symmetry axis. Light is condensed onto the surface to be scanned 406a that has a light diffusing function, through the optical system 404. An image of the light source 401 is formed on the surface to be scanned 406a. The scanning means 403 has a structure similar to the scanning means 103 in the first embodiment. The scanning means 403 scans a light beam incident thereon in two dimensional directions to scan the surface to be scanned 406a with an image of the light source. The light source 401 and the scanning means 403 are controlled in synchronization with each other, so that an image according to a certain image signal is displayed on the surface to be scanned 406a as a scanned image.

The surface to be scanned 406a constitutes a reflection type image surface, and the light reflected by the surface to be scanned 406a is incident on the light beam dividing means 405 again, and returned back toward the second optical mirror 404b. The second optical mirror 404b functions as a half mirror to reflect a part of the light that is incident on it again, but light transmitted through the second optical mirror 404b reaches the viewer's eye located at an eye point 408, through the back surface of the second reflection mirror 404b and an ocular system 407.

Figure 15:
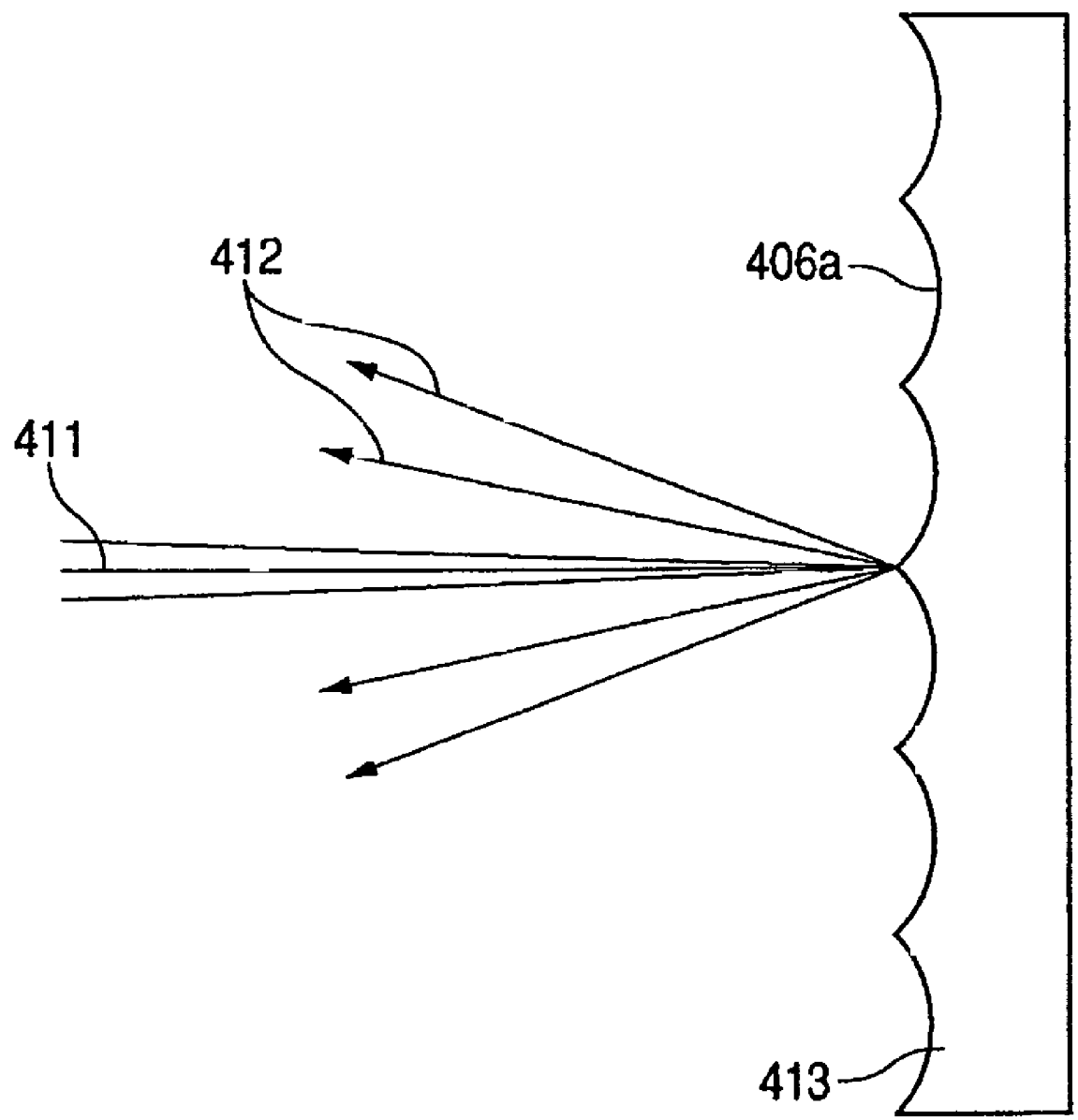
FIG. 15 illustrates effects of a reflection type light diffusing plate.

The viewer views the image displayed on the surface to be scanned 406a as a virtual image from the position of an eye point 408. A micro periodic structure such as a micro lens array is formed on the surface to be scanned 406a. FIG. 15 shows the structure of the surface to be scanned 406a. A light beam 411 is incident on the surface to be scanned 406a. A micro structure 413 is formed on the surface to be scanned 406a. The light beam diffracted by the micro structure 413 is reflected as divergent light 412. Thus, the pupil diameter viewed by the viewer is enlarged.

The operation and structure of the scanning means 403 and the light beam dividing means 405 in the fourth embodiment are similar to the scanning means 103 and the light beam dividing means 105 in the first embodiment.

The light beam dividing means 405 is constructed in such a way as to fill gaps between scanning lines with light beams, in a way similar to in the first embodiment.

The position of the light beam dividing means 405 in the fourth embodiment is shown in FIG. 14. However, the position of the light beam dividing means 405 is not limited to this, but the light beam dividing means 405 may be formed on a surface of the optical system 404 like in the third embodiment.

Although in the fourth embodiment, one light source 401 is used, the light source 401 may be replaced by red, blue and green light sources that can be modulated. In that case, full color images can be displayed. Furthermore, although in the fourth embodiment, the apparatus is arranged to scan the surface to be scanned 406a with one beam, a plurality of light sources may be provided to scan separate scan areas on the surface to be scanned with a plurality of light beams respectively.

In the fourth embodiment, the light beam dividing means 405 is disposed in the optical path between the surface to be scanned 406a and the scanning means 403. However, the position of the light beam dividing means 405 is not limited to this, but advantageous effects of the fourth embodiment are also achieved in the case where light beam dividing means having a predetermined structure is disposed between the scanning means 403 and the eye point 408 of the viewer.

Although the light beam dividing means is composed of a one-dimensional diffraction optical element, it may be replaced by a structure such as a micro prism. Any structure that is adapted to divide a light beam in the direction for filling gaps between scanning lines will achieve similar advantageous effects.

According to the above described embodiments, it is possible to provide a smooth image, in a scanning type image display apparatus in which gaps between scanning lines are hardly recognized by a viewer.

By dividing an incident light beam using light beam dividing means, it is possible to fill gaps between scanning lines to thereby form a smooth image. Accordingly, the viewer can see more natural images.

When the light beam dividing means is disposed in the optical path between the scanned image and the scanning means, it is on a far sight side for the viewer, and therefore the light beam dividing means itself and scratches and dusts on the light beam dividing means ate hardly visible.

By using the light dividing means composed of an optical element having a periodic structure, it is possible to divide a light beam utilizing a diffracting function of phase difference generated by the periodic structure. In addition, by utilizing diffraction caused by the periodic structure, it is possible to make the light beam dividing means thin, and it is possible to make the size of the entire apparatus small.

The scanning means is adapted to scan a light beam in a first scanning direction at a first frequency and in a second scanning direction at a second frequency, where the first frequency is higher than the second frequency. The scanning means is driven in the first direction by mechanical oscillation motion and adapted to draw an image in its forward and backward paths, and the light dividing means separate the light beam mainly in the second scanning direction. With these features, it is possible to effectively fill gaps between scanning lines that are generated due to scanning in the second scanning direction. Especially, it is possible to effectively reduce gaps between scanning lines in the edge portion of the screen on the surface to be scanned that are caused when drawing in the forward and backward paths is effected.

Figure 16:
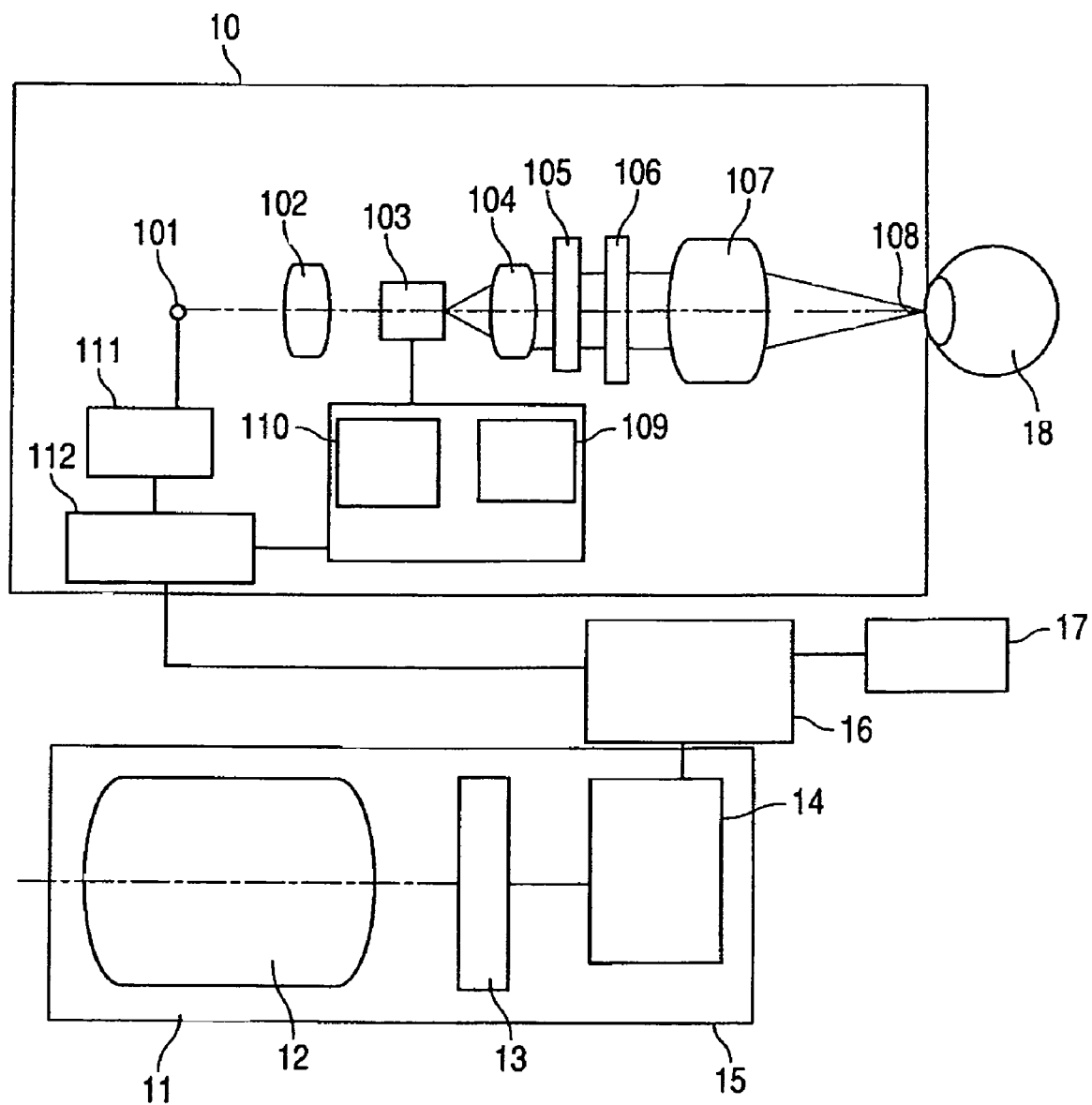
FIG. 16 is a diagram showing an image pickup apparatus according to the present invention.

FIG. 16 is a schematic diagram showing the structure of an image pickup apparatus (such as a video camera or a digital camera) equipped with the scanning type image display apparatus shown in FIG. 1. In FIG. 16, a display portion 10 is the scanning type image display apparatus shown in FIG. 1, though it is illustrated in a simplified manner. In FIG. 16, the elements same as those in FIG. 1 are designated by the same reference numerals. Reference numeral 11 designates an image pickup portion, which includes an image pickup optical system 12, an image pickup element (CCD) 13 on which an image is formed by the image pickup optical system 12 and an image pickup element drive circuit 14 for driving and controlling the image pickup element 13. The display portion 10 and the image pickup portion 11 are built in a camera apparatus (or an image pickup apparatus) 15 and they are driven and controlled by a control circuit 16 of the apparatus.

A signal of an image picked up by the image pickup portion 11 is input to the display portion drive circuit 112 of the display portion 10 through the control circuit 16 of the apparatus. The viewer (not shown) see an image displayed by scanning on the surface to be scanned 106 of the display portion 10 with his/her eye 18 positioned at the eye point 108. This image pickup apparatus 15 is connected with an interface portion 17 for the viewer.

According to this embodiment, it is possible to realize an image display apparatus that can display excellent images for view in which gaps between scanning lines on the surface to be scanned are hardly recognized.

As many apparently widely different embodiments of the present invention can be made without departing from the spirit and scope thereof, it is to be understood that the invention is not limited to the specific embodiments-thereof except as defined in the appended claims.

This application claims priority from Japanese Patent Application No. 2005-139750 filed May 12, 2005, which is hereby incorporated by reference herein.

What is claimed is:

1. An image display apparatus that displays an image on a scanned position, comprising:
   a light source unit emitting a light beam optically modulated based on image/video information;
   a scanning unit scanning the light beam emitted from said light source unit two-dimensionally;
   an optical system that guides the light beam scanned by said scanning unit to said scanned position;
   a control unit controlling operations of said light source unit and said scanning unit in synchronization with each other to form said image on said scanned position; and
   a light beam dividing unit dividing the light beam scanned by said scanning unit two-dimensionally into a plurality of light beams and emitting them;
   wherein said light beam dividing unit is disposed in an optical path between said scanning unit and said scanned position, and
   wherein said light beam dividing unit divides a light beam to be incident on an edge portion of an image on said scanned position in a direction nearly perpendicular to a scanning line drawn on said scanned position, and the intensity of first and second light beams among light beams resulting from said division is higher than twice the intensity of the light beam having the highest intensity among the other light beams.

2. An image display apparatus according to claim 1, further comprising a member to be scanned disposed at said scanned position, said member to be scanned having a function of diffusing light incident thereon.

3. An image display apparatus according to claim 2, further comprising a viewing optical system that guides a light beam emitted from said member to be scanned to an eye of a viewer.

4. An image display apparatus according to claim 1, wherein said light beam dividing unit is disposed in an optical path between said optical system and said scanned position.

5. An image display apparatus according to claim 1, wherein said light beam dividing unit comprises a periodic structure that divides a light beam to be incident on the member to be scanned into a plurality of light beams and convert them to a plurality of directions different from each other.

6. An image display apparatus that displays an image on a scanned position, comprising:
 a light source unit emitting a light beam optically modulated based on image/video information;
 a scanning unit scanning the light beam emitted from said light source unit two-dimensionally;
 an optical system that guides the light beam scanned by said scanning unit to said scanned position;
 a control unit controlling operations of said light source unit and said scanning unit in synchronization with each other to form said image on said scanned position; and
 a light beam dividing unit dividing the light beam scanned by said scanning unit two-dimensionally into a plurality of light beams and emitting them;
 wherein said light beam dividing unit is disposed in an optical path between said scanning unit and said scanned position, and
 wherein said light beam dividing unit divides a light beam to be incident on a central portion of an image on said scanned position in a direction nearly perpendicular to a scanning line drawn on said scanned position, and the intensity of a first light beam among light beams resulting from said division is higher than twice the intensity of the light beam having the highest intensity among the other light beams.

7. An image display apparatus according to claim 1, wherein said scanning unit scans the light beam in a first direction at a first frequency and scans the light beam in a second direction that is perpendicular to the first scanning direction at a second frequency lower than the first frequency, said first frequency is generated by a mechanical resonant motion of the scanning unit whereby an image is formed on said member to be scanned in forward and backward scanning paths, and a plurality of light beams emerged from said light beam dividing unit is arranged along said second direction at the scanned position.

8. An image pickup apparatus comprising:
 an image pickup portion that picks up an image of a subject; and
 an image display apparatus that displays an image obtained by said image pickup portion,
 wherein said image display apparatus comprises:
 a light source unit for emitting a light beam optically modulated based on image/video information;
 a scanning unit for scanning the light beam emitted from said light source unit two-dimensionally;
 an optical system that guides the light beam scanned by said scanning unit to said scanned position;
 a control unit for controlling operations of said light source unit and said scanning unit in synchronization with each other to form said image on said scanned position; and
 a light beam dividing unit for dividing the light beam scanned by said scanning unit two-dimensionally into a plurality of light beams and emitting them,
 wherein said light beam dividing unit divides a light beam to be incident on an edge portion of an image on said scanned position in a direction nearly perpendicular to a scanning line drawn on said scanned position, and the intensity of first and second light beams among light beams resulting from said division is higher than twice the intensity of the light beam having the highest intensity among the other light beams.

9. An image display apparatus that displays an image on a scanned position, comprising:
 a light source unit emitting a light beam optically modulated based on image/video information;
 a scanning unit scanning the light beam emitted from said light source unit two-dimensionally;
 an optical system that guides the light beam scanned by said scanning unit to said scanned position;
 a control unit controlling operations of said light source unit and said scanning unit in synchronization with each other to form said image on said scanned position; and
 a light beam dividing unit dividing the light beam scanned by said scanning unit two-dimensionally into a plurality of light beams and emitting them,
 wherein said light beam dividing unit is disposed in an optical path between said scanning unit and said scanned position, and
 wherein said light beam dividing unit changes intensities of the plurality of light beams such that the intensity of the light beam on an edge portion of the image on the scanned position among the plurality of light beams is different from that of the light beam on a central portion of the image.

10. An image pickup apparatus comprising:
 an image pickup portion that picks up an image of a subject; and
 an image display apparatus that displays an image obtained by said image pickup portion,
 wherein said image display apparatus comprises:
 a light source unit for emitting a light beam optically modulated based on image/video information;
 a scanning unit for scanning the light beam emitted from said light source unit two-dimensionally;
 an optical system that guides the light beam scanned by said scanning unit to said scanned position;
 a control unit for controlling operations of said light source unit and said scanning unit in synchronization with each other to form said image on said scanned position; and
 a light beam dividing unit for dividing the light beam scanned by said scanning unit two-dimensionally into a plurality of light beams and emitting them,
 wherein said light beam dividing unit divides a light beam to be incident on a central portion of an image on said scanned position in a direction nearly perpendicular to a scanning line drawn on said scanned position, and the intensity of a first light beam among light beams resulting from said division is higher than twice the intensity of the light beam having the highest intensity among the other light beams.

* * * * *